(12) United States Patent
Kobata

(10) Patent No.: US 6,321,348 B1
(45) Date of Patent: Nov. 20, 2001

(54) SYSTEM FOR REMOTE INTERNET CONSULTING, SERVICING AND REPAIR

(75) Inventor: Hiroshi Kobata, Brookline, MA (US)

(73) Assignee: e-Parcel, Inc., Newton, MA (US)

( * ) Notice: Subject to any disclaimer, the term of this patent is extended or adjusted under 35 U.S.C. 154(b) by 0 days.

(21) Appl. No.: 08/826,709

(22) Filed: Apr. 7, 1997

(51) Int. Cl.⁷ ...................................................... G06F 11/30
(52) U.S. Cl. ............................ 714/37; 709/224; 709/203
(58) Field of Search ........................ 395/200.33, 200.54, 395/200.48, 200.38, 183.01, 183.02, 183.13; 709/203, 224, 218, 208; 714/25, 26, 37

(56) References Cited

U.S. PATENT DOCUMENTS

| | | | |
|---|---|---|---|
| 5,307,490 | * 4/1994 | Davidson et al. | 709/328 |
| 5,471,615 | 11/1995 | Amatsu et al. | 709/202 |
| 5,504,892 | 4/1996 | Amatsu et al. | 707/103 R |
| 5,666,534 | * 9/1997 | Gilbert et al. | 713/1 |
| 5,689,726 | 11/1997 | Lin | 710/10 |
| 5,732,219 | 3/1998 | Blumer et al. | 709/227 |
| 5,740,431 | 4/1998 | Rail | 707/200 |
| 5,742,829 | 4/1998 | Davis et al. | 717/11 |
| 5,745,738 | 4/1998 | Ricard | 703/13 |
| 5,774,644 | 6/1998 | McKinstry | 714/25 |
| 5,812,779 | 9/1998 | Ciscon et al. | 709/223 |
| 5,815,852 | * 9/1998 | Ote et al. | 714/31 |
| 5,920,873 | 7/1999 | Van Huben et al. | 707/202 |

* cited by examiner

Primary Examiner—Kenneth R. Coulter
(74) Attorney, Agent, or Firm—Daly, Crowley & Mofford, LLC

(57) ABSTRACT

In an Internet-based client/server application, a system is provided to detect the infrastructure at the client side so as to ascertain information such as the computer type, what peripherals are attached to the computer, CPU power, hard disk space, what viewer or sound card is installed and the Internet connection information associated with the client and to automatically transmit required software to the client or give the client consulting advice to remotely identify problems and provide solutions, to install new software and to remotely instruct individuals as to how to use their machines. In one embodiment, each user is provided with software having a unique serial number. Having the serial number, infrastructure data is checked at the client side and reported to the server periodically, with the server updating a database with the infrastructure data from each PC to permit the remote consulting and repair.

18 Claims, 3 Drawing Sheets

Microfiche Appendix Included
(2 Microfiche, 135 Pages)

SYSTEM FOR REMOTE INTERNET CONSULTING, SERVICING AND REPAIR

FIELD OF INVENTION

REFERENCE TO MICROFICHE APPENDIX

The disclosure of the present invention includes a microfiche appendix. The total number of microfiche included in the appendix is 2. The total number of microfiche frames included in the appendix is 135.

This invention relates to the provision of data over the Internet and, more particularly, to a system for ascertaining the demography of the users of the Internet and to provide appropriate software or consulting services based on the user's infrastructure data.

BACKGROUND OF THE INVENTION

With increasing use of the Internet and its expanding capabilities comes the requirement for specialized hardware, or at least hardware which can be reprogrammed to accommodate various applications. The capabilities of user's PCs vary widely from hard disk space, to operating system, to Internet connection, to various viewers, to sound cards and peripherals, including printers, faxes and various display apparatus.

It is oftentimes very frustrating to the user to attempt to go on-line only to find out that either the program or equipment that he/she is using is incompatible with the application. Installing the appropriate sound card for the particular computer and operating system can cause endless hours of frustration, repeat phone calls to technical support and, in general, can involve bringing the PC directly to a technical support house so that the PC can be appropriately configured for the application.

The compatibility of certain peripherals with particular PC's is also a problem in which the PC drivers must be appropriately configured to handle the peripheral involved. Oftentimes, the manufacturer does not provide a sufficiently reader-friendly manual or provide quick start procedures which would enable the user to set up and enjoy the piece of equipment that he has purchased.

The above problems resolve themselves into a category called "installation problems" which occur most frequently to the uninitiated. It is these users or clients who are most in need of assistance in a user-friendly environment. As described in U.S. patent application Ser. No. 08/801,458 filed Feb. 18, 1997 by Hiroshi Kobata et al., it is possible to detect the demography of the Internet user in which client software is installed at each PC that can detect the infrastructure of the PC. The software which is provided by the provider to the user enables sensing CPU power, hard disk space, the applications running or installed, network connectivity and the log-in history. Since each client software has a unique serial number, sensing the serial number at the server side provides for rapid transfer and loading of a database with infrastructure data which is reported to the server periodically, for instance, every two seconds. At the server side, the database can be updated frequently to provide instant demographics of the particular user.

The availability of the demography of a particular user, while being useful to the content provider, has a utility in providing consulting services to the user, for instance, to permit installation of peripherals or other equipment.

SUMMARY OF THE INVENTION

In one embodiment, the demography of the user is utilized to ascertain the user's problem without communication with the user. This is accomplished because it is possible to sense the applications running on the user's PC as well as the log-in history and system demographies. It is oftentimes possible to ascertain problems at the client side without actually having to interface with the client if the client's infrastructure is known to the consultant group. In one embodiment, assuming it is possible to ascertain the particular problem, new software can be automatically downloaded to the client to fix the client's problem with a minimum of client time and frustration.

For instance, if the demography indicates that the client is having trouble using his/her printer, it can be ascertained the printer type, the model and the likely printer driver software that would be needed with the particular computer at the client. The printer driver can be downloaded to the client and the client's computer reconfigured, thus minimizing the need of a service call or even communication between the user and a technical support group. Moreover, it is possible knowing the demographics of the user's PC to download instructions to the user so that the user may properly install a given piece of equipment.

Even if the problems are not readily ascertainable through ascertaining the demography of the user's equipment, it is nonetheless useful, having this demography, to provide consulting advice to the user if the particular fix cannot be delivered immediately over the Internet. By providing demography to the consultant group, it is possible to provide instructions to the user which are both timely and effective in rapidly solving the user's problem.

What is therefore provided in an Internet-based client/server application is a system which detects the demographics of a client including CPU power, hard disk space, applications installed, network connectivity and log-in history so as to provide this information to an artificial intelligence or expert type consulting system in which the information is analyzed and appropriate corrective measures are transmitted back to the client. In order for the user's PC to be able to report the user's infrastructure, software is delivered to the user which enables the transmission back to the server of the aforementioned demography. The software provided to each user bears a unique serial number in one embodiment. Having the serial number, infrastructure data is sensed at the client side and reported to the server periodically, with the server updating a database with the infrastructure from each PC. The artificial intelligence system at the server side can filter the incoming data so as to be able to ascertain what problems, if any, exist at the client's side and to make recommendations either to an individual who will then communicate with the client over the Internet or to provide corrective action through the automatic transmission of new software over the Internet to the client.

In summary, in an Internet-based client/server application, a system is provided to detect the infrastructure at the client side so as to ascertain information such as the computer type, what peripherals are attached to the computer, CPU power, hard disk space, what viewer or sound card is installed and the Internet connection information associated with the client and to automatically transmit required software to the client or give the client consulting advice to remotely identify problems and provide solutions, to install new software and to remotely instruct individuals as to how to use their machines. In one embodiment, each user is provided with software having a unique serial number. Having the serial number, infrastructure data is checked at the client side and reported to the server periodically, with the server updating a database with the infrastructure data from each PC to permit the remote consulting and repair.

BRIEF DESCRIPTION OF THE DRAWINGS

These and other features of the subject invention will be better understood taken in conjunction with the Detailed Description in conjunction with the Drawings of which.

DETAILED DESCRIPTION

Figure 1:
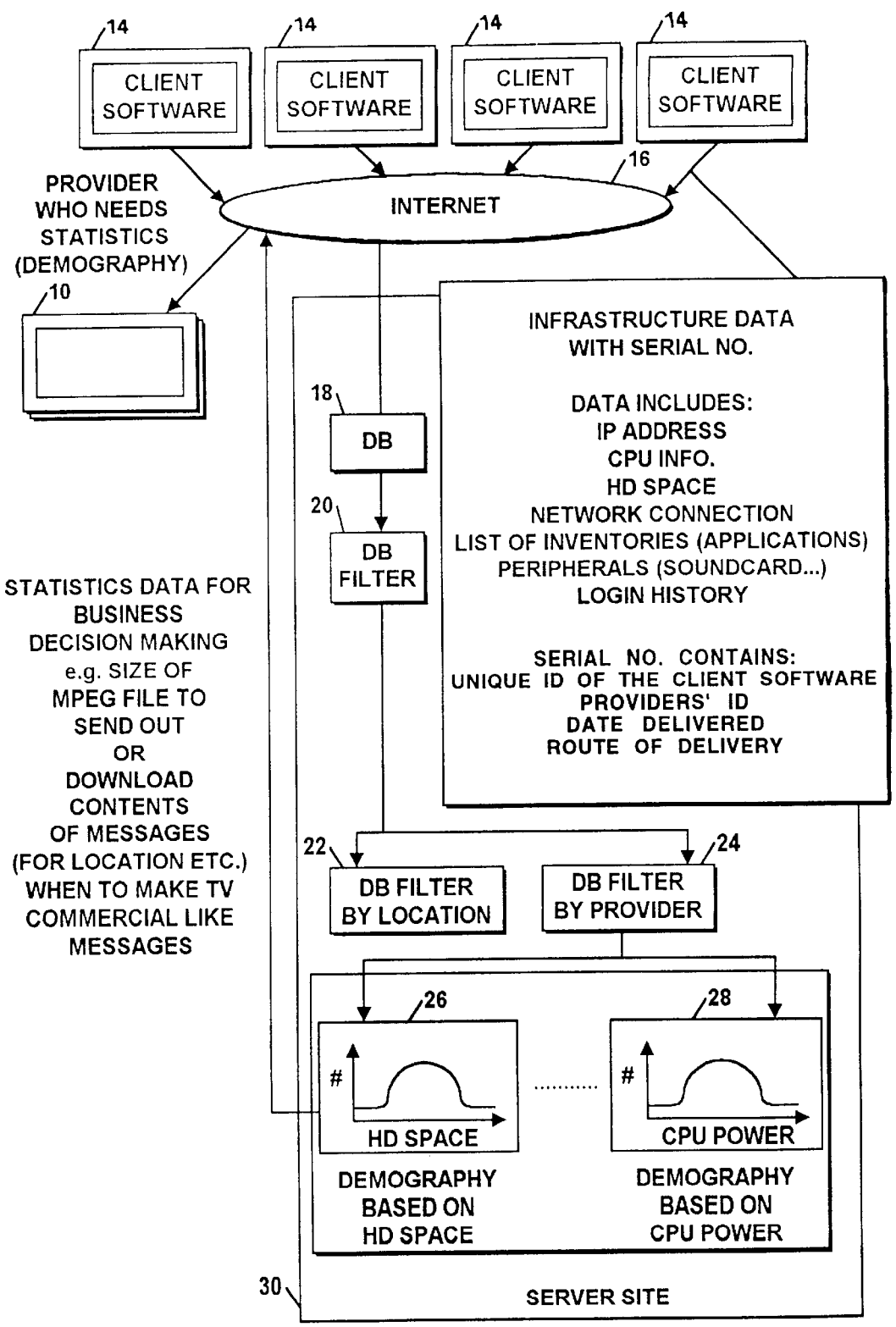
FIG. 1 is a block diagram of demographic detection portion of the subject system illustrating the ability to provide a database with real-time demographic information from the users, along with a filter system to be able to tailor the demographic output to be the most useful to the provider.

Referring now to FIG. 1, as to obtaining client demography in the subject system, a provider 10 provides software to each of clients 14 which causes the associated computer connected to the Internet to transmit not only a serial number, but also the IP address, CPU information, hard disk space, network connection, a list of inventories, peripherals such as sound cards, and the log-in history associated with each individual client. Client and server are connected via the Internet, here diagrammatically illustrated at 16.

The information is passed to a database 18 at the provider which, optionally, is provided with a database filter 20 so that the data may be filtered as to location as illustrated at 22 or is further filtered by the provider as illustrated at 24. It will be appreciated that there are other filter functions that can be applied to the database for the filtering of the statistics garnered by the subject system.

If, as illustrated, the statistics come from members of a provider because the provider provides the client software, then the provider is provided with information relating to his members and his members alone.

The data for a provider, when retrieved, may be in the form of a graph 26 of hard disk space versus number of CPU's or, alternatively, can be provided in terms of CPU power as illustrated at 28, with the information being developed at the server side, here illustrated at 30, and with the information from the server side being delivered to a consulting group after it has been derived.

Figure 2:
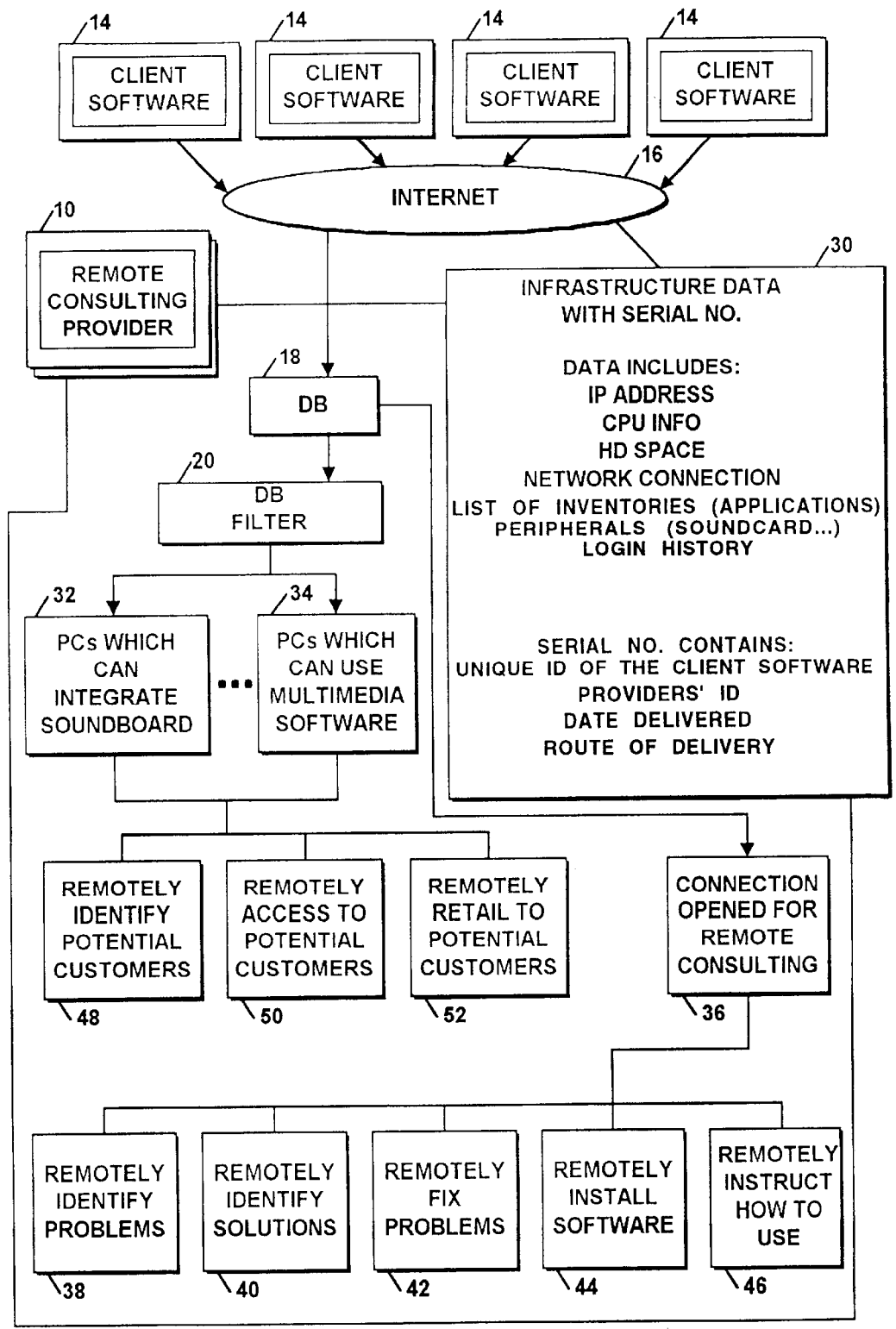
FIG. 2 is a block diagram showing the provision of consulting services and software based on the demography of a particular client indicating the opening of a remote consulting connection with the client to provide the required services; and, FIG. 3 is a block diagram indicating the installation of client software followed by PC infrastructure reporting, in turn followed by remote problem analysis and solution generation followed by access to client software by IP address and access to the client's operating system.

Referring now to FIG. 2, the infrastructure data which is analyzable from the client is shown by box 30 to include such things as IP address, CPU information, hard disk space, network connection, a list of inventories or applications, peripherals such as sound cards and the log-in history. Also, that which is available is the serial number of the software which has been provided to the client which provides a unique ID of the client software, the provider's ID, the date delivered and the route of delivery.

Having this type of information at the server side permits either an expert or artificial intelligence analysis of a particular client's PC. For instance, the analysis can include an indication of whether the PC can integrate a sound board as illustrated at 32 or, for instance, whether the PC can use multi-media software as illustrated at 34.

Indeed there are large ranges of capabilities which are ascertained from the demography so that at the server side, information can be transmitted to the client side to correct problems or at least alert the user as to the existence of the problem and the potential solution.

For instance, as illustrated at box 36, a connection can be opened for remote consulting such that either the expert system or an individual can remotely identify problems as illustrated at 38, remotely identify solutions as illustrated at 40, remotely fix problems as illustrated at 42, remotely install software as illustrated at 44 or remotely instruct the user how to use his equipment as illustrated at 46.

The database information of the infrastructure of all the clients can also be used by the consultant group to remotely identify potential customers as illustrated at 48, to remotely access the potential customers as illustrated at 50 or to remotely retail to the potential customers as illustrated at 52.

The system can not only identify a particular client's problems, it can also identify those clients that could potentially utilize the consulting services.

Figure 3:
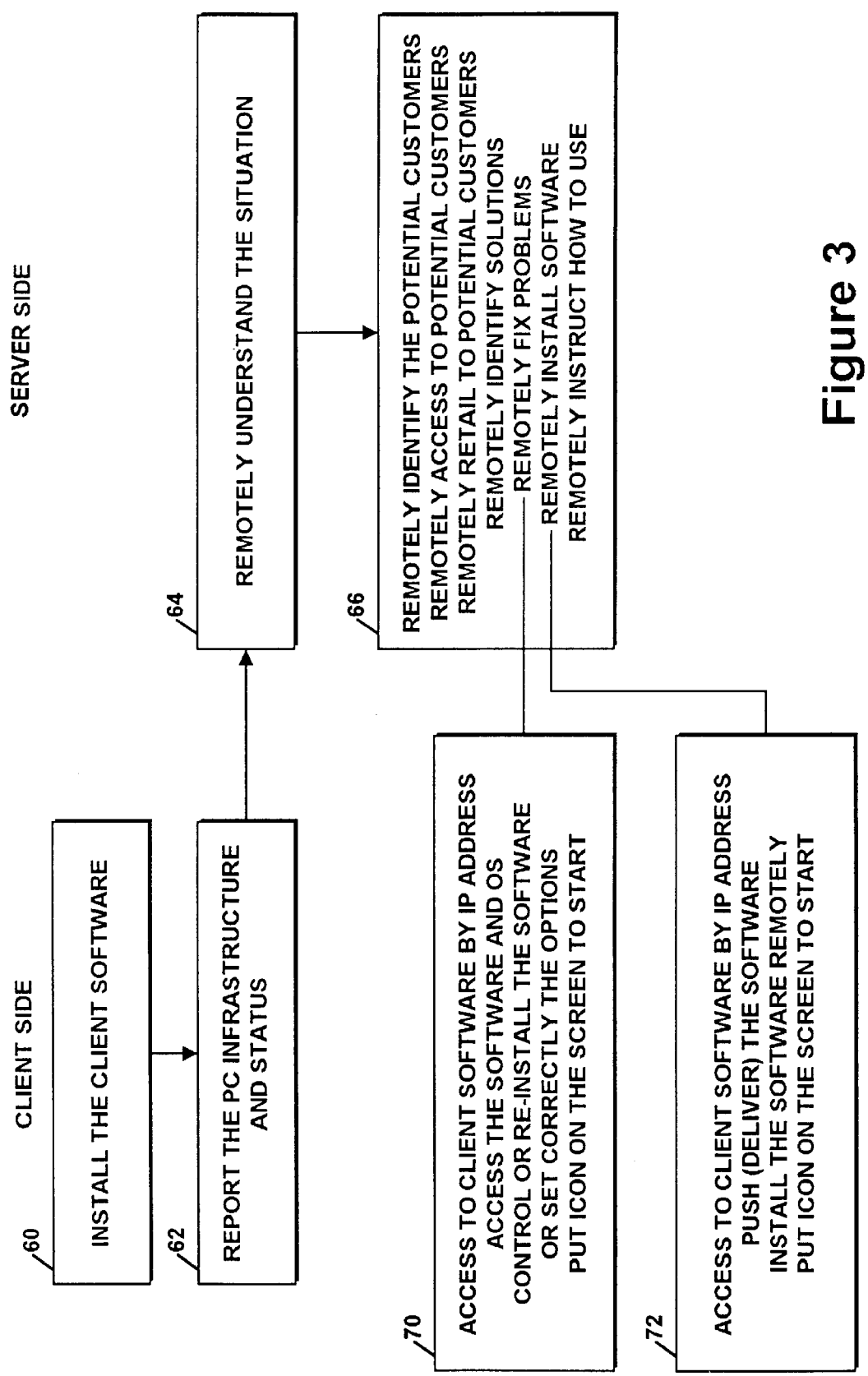

Referring now to FIG. 3, from an operational point of view as illustrated at box 60 on the client side, it is important to install client software at the individual client site, whereupon the PC at the client site reports the PC infrastructure and status as illustrated at 62 across the network to the server side, where it is analyzed at 64. It is important that the consulting group be in a position to remotely understand what is happening on the client side. One of many expert systems may be utilized to analyze the situation at the client side and to remotely perform the functions associated with boxes 38-52 of FIG. 2.

With respect to remotely fixing the problems, the server side requires access to the client's software by IP address as illustrated at 70, followed by access to the software running at the client side as well as the operating software, thus to be able to control or reinstall the software or to appropriately set the options so that the client side unit is properly configured and runs properly. It is then possible to place an icon on the screen when such remote fix operation has been completed, so as to alert the user that the service has been rendered.

With respect remotely installing software, as illustrated at 72, access is required to client software by IP address and a push or delivery operation then ensues to deliver the software to the client. Thereafter, the software is installed from the remote location. As shown at box 70, an icon is placed on the screen once the software has been installed.

What follows is a program listing for the subject system. What is first presented is a system to acquire the demographics of a particular client. Secondly, an expert system is provided analyze the demographics. Thus, the program listings which follow are divided up into the demographics enabling source code and the expert system source code for analyzing one of the many often occurring problems encountered by users in the installation of their peripherals and applications software, with the downloading of software to correct the detected problem.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A system for providing consulting advice to network users from a server to a client in which said client has a computer coupled to said network, comprising:

means at the client for automatically ascertaining said client infrastructure and for transmitting said client infrastructure to said server, said client infrastructure comprising a plurality of: computer type, login history, application types, peripheral types, CPU power, hard disk space, and network connection information;

means at said server for ascertaining a problem that said client may be having with his computer, thus to remotely identify said problem, wherein said problem caused by an incompatibility of said client infrastructure; and, means at said server for contacting said client over said network for providing said consulting advice as to said problem.

2. The system of claim 1 and further including means at said server for automatically diagnosing said problem and for downloading corrective software to said client.

3. The system of claim 1 and further including means for providing said client with software for automatically detecting said client infrastructure.

4. The system of claim 3 wherein said software for detecting said client infrastructure includes a serial number unique to said client and means for periodically detecting said infrastructure and for transmitting the result thereof to said server.

5. The system of claim 4 wherein said server further includes a database and means for updating said database with said periodically detected infrastructure.

6. The system of claim 1 wherein said infrastructure includes applications run on said computer.

7. The system of claim 1 wherein said computer has a viewer coupled to said computer and wherein said infrastructure includes the identity of said viewer.

8. The system of claim 1 wherein said computer has a sound card coupled thereto and wherein said infrastructure includes the identity of said sound card.

9. The system of claim 1 wherein said computer has a hard drive and wherein said infrastructure includes the size of said hard drive.

10. The system of claim 1 wherein said infrastructure includes the CPU power of said computer.

11. The system of claim 1 wherein said infrastructure includes network connection information associated with said computer.

12. A system for providing consulting advice to network users from a server to a client in which said client has a computer coupled to said network, comprising:

a computer program provided to said client for periodically detecting client infrastructure comprising a plurality of: computer type, login history, application types, peripheral types, CPU power, hard disk space, and network connection information; and a system for detecting a problem associated with said client computer which is caused by an incompatibility of said client infrastructure and for providing said consulting advice to said client over said network in response to said detected problem.

13. The system of claim 12 further comprising a database for storing said client infrastructure.

14. The system of claim 13 wherein said computer program has a unique serial number.

15. The system of claim 14 wherein said unique serial number of said computer program is stored in said database in association with said client infrastructure.

16. The system of claim 12 wherein said system is an artificial intelligence system.

17. A system for providing consulting advice to network users from a server to a client in which said client has a computer coupled to said network, comprising:

means for providing said client with software for automatically detecting said client infrastructure, wherein said software includes a serial number unique to said client;

means at the client for automatically ascertaining said client infrastructure and for transmitting said client infrastructure to said server;

means at said server for ascertaining, in response to said client infrastructure, any problem said client may be having with his computer, thus to remotely identify said problem; and, means at said server for contacting said client over said network for providing said consulting advice as to said problem.

18. A method for providing consulting advice to network users from a server to a client having a computer coupled to said network, wherein said client computer has an infrastructure associated therewith comprising at least one of: the computer type, the peripherals attached to the computer, CPU power, hard disk space, login history, application types, and network connection information, said method comprising the steps of:

detecting said client infrastructure with a computer program provided by said server to said client and transmitting said detected infrastructure to said server; and ascertaining a problem associated with said client computer at said server, wherein said problem is caused by an incompatibility of said client infrastructure.

\* \* \* \* \*

UNITED STATES PATENT AND TRADEMARK OFFICE
CERTIFICATE OF CORRECTION

PATENT NO. : 6,321,348 B1
DATED : November 20, 2001
INVENTOR(S) : Kobata

It is certified that error appears in the above-identified patent and that said Letters Patent is hereby corrected as shown below:

Column 1,
Lines 10-14, move this paragraph to line 5 after the "FIELD OF INVENTION" title.
Line 20, delete "user's" and replace with -- users' --.
Line 36, delete "PC's" and replace with -- PCs --.

Column 3,
Line 6, delete "of demographic" and replace with -- of a demographic --.

Column 4,
Line 39, delete "respect remotely" and replace with -- respect to remotely --.
Line 48, delete "provided analyze" and replace with -- provided to analyze --.

Column 5,
Line 9, delete "problem caused" and replace with -- problem is caused --.

Signed and Sealed this

Fourth Day of June, 2002

Attest:

Attesting Officer

JAMES E. ROGAN
Director of the United States Patent and Trademark Office